UNITED STATES PATENT OFFICE.

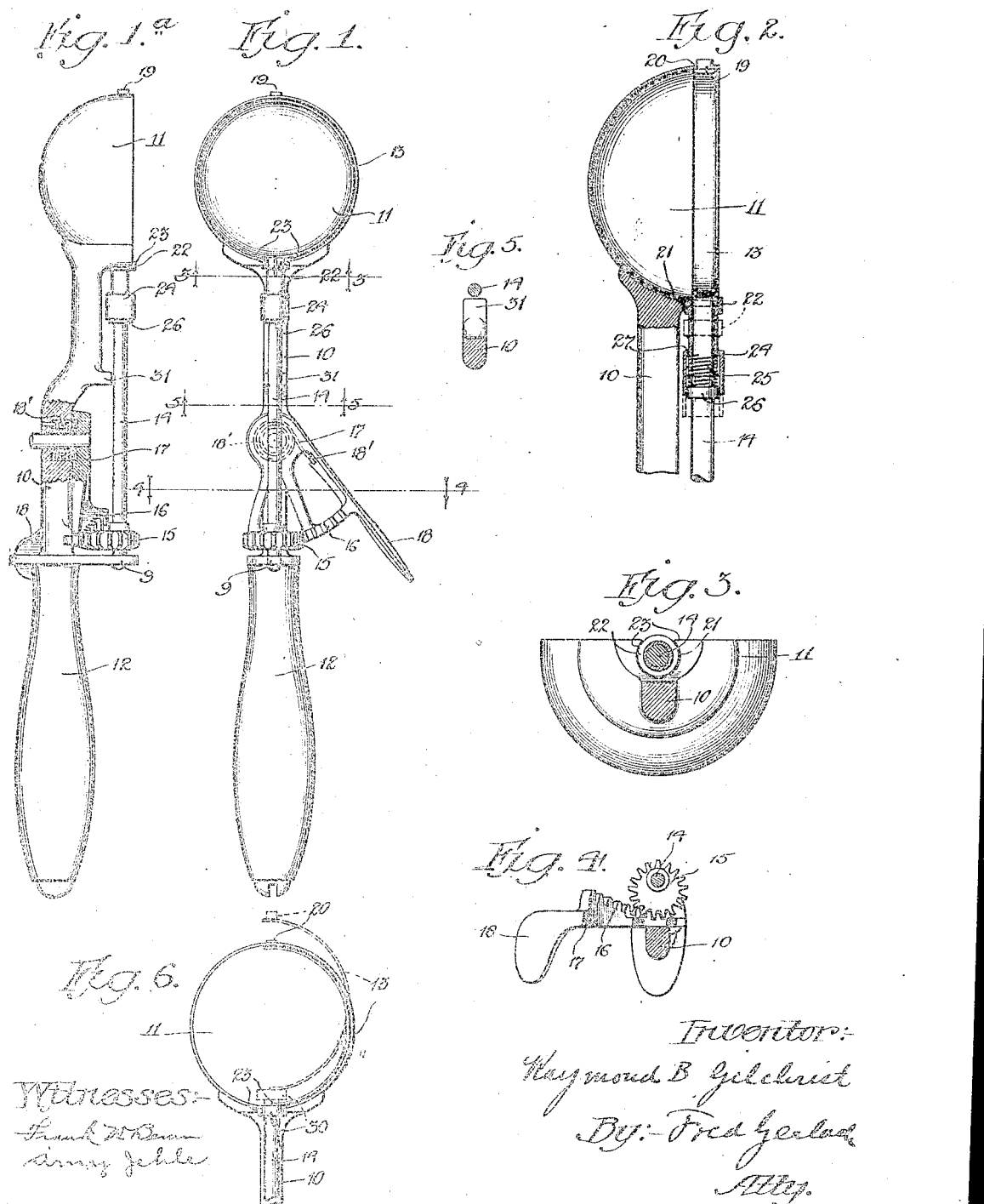

RAYMOND B. GILCHRIST, OF NEWARK, NEW JERSEY, ASSIGNOR TO THE GILCHRIST COMPANY, OF NEWARK, NEW JERSEY, A CORPORATION.

ICE-CREAM DISHER.

1,109,579.  Specification of Letters Patent.  Patented Sept. 1, 1914.

Application filed June 24, 1911. Serial No. 635,192.

*To all whom it may concern:*

Be it known that I, RAYMOND B. GILCHRIST, a resident of Newark, in the county of Essex and State of New Jersey, have invented certain new and useful Improvements in Ice-Cream Dishers, of which the following is a full, clear, and exact description.

The invention relates to ice-cream dishers and designs to provide a simple and efficient device in which provision is made for conveniently and quickly removing the scraper and for cleaning the several parts.

The invention consists of the several novel features hereinafter set forth and more particularly defined by claims at the conclusion hereof.

In the drawings; Figure 1 is a plan of an ice-cream disher embodying the preferred form of the invention. Fig. 1ª is a side-elevation, parts being shown in section. Fig. 2 is a central longitudinal section through the bowl. Fig. 3 is a section taken on line 3—3 of Fig. 1. Fig. 4 is a section taken on line 4—4 of Fig. 1. Fig. 5 is a section taken on line 5—5 of Fig. 1. Fig. 6 is a plan illustrating a modified form of the invention.

The improved disher comprises a suitable frame or handle 10, a bowl 11 secured to one end thereof and a grip 12 secured to the other end thereof. A scraper 13 formed of a resilient strip of metal is mounted to sweep around the inner surface of the bowl, to remove the ice-cream from the bowl. This scraper is rigidly secured to a shaft or spindle 14 which extends longitudinally of the handle and above it, and has secured thereto a pinion 15 adapted to be operated by a rack 16 on a finger-lever 17 which is pivotally connected to the frame in suitable manner. A spring 18' is applied to operate lever 17 in one direction. The lever is provided with a finger-piece 18 extending rearwardly and laterally from the lever-pivot, whereby the lever may be operated.

Scraper 13 and spindle 14 are removably connected to the bowl and handle respectively to permit easy removal, when the device is to be cleaned. The outer end of scraper 14 is provided with a trunnion 19 which is removably held in a bearing 20 at one side of the bowl. The inner end of shaft 14 is removably held in a bearing 9 on the frame or handle 10. An open bearing 21 is formed in bowl 11 and frame 10 to support the spindle and scraper intermediate the trunnion 19 and bearing 9. A journal 22 is provided on a spindle which is adapted to fit into the open bearing 21. This journal 22 is removably held in bearing 21 and is removable with shaft 14. The overhanging portions 23 of bearing 21 serve to hold journal 22 and shaft 14 in said bearing. Journal 22 is formed on a sleeve 24 which is slidably held on shaft 14 and is normally pressed toward and against the inner end of scraper 13, by a coil-spring 25 which encircles shaft 14 and engages a collar 26 fixed on the shaft and a shoulder 27 on the sleeve. By means of this sleeve and slidable connection, the journal 22 may be drawn out of bearing 21 so that when trunnion 19 is sprung out of its bearing 20, shaft 14 may be shifted longitudinally to withdraw the inner end thereof from bearing 9, and then the opening in bearing 21 will permit shaft 14 to be removed from said bearing. When the sleeve 24 is moved inwardly, as indicated by dotted lines, Fig. 2, and trunnion 19 is released the shaft may be shifted longitudinally to draw its inner end out of bearing 9 and then the shaft will be entirely disconnected from the handle.

In Fig. 6 is illustrated a modified form of the invention, in which a journal 30 is fixed on shaft 14 and is held in the open bearing 23. In this form of the invention, when trunnion 19 is sprung out of its bearing in the bowl, the shaft 14 and its journal 30 may be shifted longitudinally so the latter will clear the open bearing and then the shaft may be removed from the open bearing, it being understood that when journal 30 is in the position indicated in dotted lines of Fig. 6, the inner end of the spindle carried by bearing 9 will be withdrawn therefrom and that the scraper in the bowl serves to hold the shaft against longitudinal movement and in its bearings.

In practice it has been found, that in the type of device exemplified, in which the shaft 14 extends inwardly to a point adjacent grip 12, the shaft is sometimes sprung as a result of being struck against an ice-cream can or tub, and to overcome any possibility of being sprung, an abutment 31 is formed on the handle. This abutment is disposed intermediate the bearings for the shaft and effectively serves to prevent the shaft from being sprung toward the frame. In practice it has also been found, that greatest power is required during the initial movement of the scraper, because the scraper tends to move the entire body of material in the bowl, rather than to act as a knife while passing between the bowl and the ice-cream, and that, after the ice cream has been partially removed from the bowl less force is required to effect the movement of the operation. To meet these difficulties and to render the device more easily operable, the gear-connections between lever 17 and scraper shaft 14 is constructed to operate differentially, that is, to apply greater power to the scraper during its initial movement. As illustrated in Fig. 4 pinion 15 is eccentrically secured to and mounted on shaft 14 so that in normal or starting position, the gear will have a long radius or leverage, and a relatively decreasing radius and leverage during the remainder of the stroke. The rack 16 is inclined or formed to compensate for the variation in radius of the operative portion of pinion 15. Resultantly during the initial movement of finger-piece 18 greater force will be applied and greater leverage will be attained, as necessary to initially remove the ice-cream in the bowl, and thereafter the leverage will decrease as the resistance of the cream to the scraper decreases.

The invention is not to be understood as restricted to the details set forth since these may be modified by the skilled mechanic within the scope of the appended claims without departing from the spirit and scope of the invention.

Having thus described the above invention what I claim as new and desire to secure by Letters Patent is:

1. In an ice-cream disher, the combination of a handle, a bowl on the handle, a scraper for the bowl, a shaft to which the scraper is secured, a bearing on the handle, for the inner end of the shaft, an open bearing for the outer end of the shaft, provided with means for holding the shaft therein, a pinion on said shaft and disposed between said shaft bearings, and a lever and rack for rotating said pinion, said shaft having means movable longitudinally out of the bearing to permit withdrawal of the shaft through the open-bearing.

2. In an ice-cream-disher, the combination of a handle, a bowl on the handle, a scraper for the bowl, a trunnion on the scraper, a bearing in the bowl for said trunnion, a shaft to which the scraper is secured, a bearing on the handle for the inner end of the shaft, an open bearing for the outer end of the shaft, provided with means for holding the shaft therein, a pinion on said shaft and disposed between said shaft bearings and a lever and rack for rotating said pinion, said shaft being removably held in said bearings and having means movable out of the bearing at the outer end of the shaft to a position which permits withdrawal of the shaft through the open bearing, said scraper being resilient to hold the shaft against longitudinal movement in its bearings.

3. In an ice-cream-disher, the combination of a handle, a bowl on the handle, a scraper for the bowl, a shaft to which the scraper is secured, a bearing on the handle for the inner end of said shaft, a bearing for the outer end of the shaft, provided with a restricted opening, the shaft having an enlargement thereon fitting in said open bearing and with a part, which, when shifted from the open bearing, permits the shaft to be withdrawn laterally from said open bearing, said shaft being longitudinally movable in its bearings, a pinion on said shaft, and a lever and rack for operating said pinion and shaft.

4. In an ice-cream disher, the combination of a handle, a bowl on the handle, a scraper for the bowl, a trunnion on the scraper, a bearing in the bowl for said trunnion, a shaft to which the scraper is secured, a bearing on the handle for the inner end of the shaft, a bearing for the outer end of the shaft provided with a restricted opening, the shaft having an enlargement thereon fitting in said open bearing and with a part, which, when shifted from the open bearing, permits the shaft to be withdrawn laterally from said open bearing, said shaft being longitudinally movable in its bearings, a pinion on said shaft, and a lever and rack for operating said pinion and shaft.

5. In an ice-cream disher, the combination of a handle, a bowl on the handle, a scraper for the bowl, a lever pivoted to the handle and differentially operating gear-mechanism between the lever and the scraper.

6. In an ice-cream disher, the combination of a handle, a bowl on the handle, a scraper for the bowl, a shaft to which the scraper is secured, a lever pivoted to the handle, and differentially operating gear-mechanism between the lever and the shaft.

7. In an ice-cream disher, the combination of a handle, a bowl on the handle, a scraper removably held in the bowl, a lever pivoted to the handle, and differentially operating gear mechanism between the lever and the scraper, comprising a gear-element movable with the scraper.

8. In an ice-cream disher, the combination of a handle, a bowl on the handle, a scraper removably held in the bowl, a shaft to which the scraper is secured and removable with the scraper, a lever pivoted to the handle, and differentially operating gear-mechanism between the lever and the shaft, comprising a pinion removable with the shaft.

9. In an ice-cream disher, the combination of a handle, a bowl on the handle, a scraper for the bowl, a shaft to which the scraper is secured, a pinion on the shaft and a lever pivoted to the handle and provided with a rack, said rack and pinion being formed to operate differentially to apply the greatest power during the initial movement of the scraper.

10. In an ice-cream disher, the combination of a handle, a bowl on the handle, a scraper for the bowl, a shaft to which the scraper is secured, said shaft being removably connected to the handle and removable with the scraper, a bearing on the handle, a bearing for the shaft adjacent the bowl, a bearing for the inner end of the shaft, an abutment for the shaft intermediate said bearings, and mechanism for rotating the shaft said shaft being disposed to overlie the handle, the abutment being disposed to prevent the shaft from being bent by impact from the direction of the mouth of the bowl.

11. In an ice-cream disher, the combination of a handle, a bowl on the handle, a scraper for the bowl, a shaft secured to the scraper, a lever pivoted to the handle, a bearing through which the shaft passes, a sleeve slidably held in said bearing and for holding the shaft therein, said shaft and scraper being removable, and lever-operated means for rotating said shaft.

12. In an ice-cream disher, the combination of a handle, a bowl on the handle, a scraper for and removably held in the bowl, a shaft secured to the scraper, a lever pivoted to the handle, a pinion on said shaft, a lever-operated rack for rotating the pinion, a bearing for the shaft, and a sleeve mounted to slide in said bearing, whereby the shaft will be held in the bearing.

13. In an ice-cream disher, the combination of a handle, a bowl on the handle, a scraper for the bowl, a shaft secured to the scraper, an open undercut bearing for the shaft, a sleeve slidably held in the bearing for holding the shaft therein, and lever-operated mechanism for rotating the shaft.

14. In an ice-cream disher, the combination of a handle, a bowl on the handle, a scraper for the bowl, a shaft secured to the scraper, a bearing for the inner end of the shaft, an open undercut bearing for the outer end of the shaft, a sleeve slidably mounted on the shaft and fitting in said open bearing to hold the shaft therein, said shaft being removable from its bearings and lever-operating means on the shaft for rotating the scraper.

15. In an ice-cream disher, the combination of a handle, a bowl on the handle, a scraper for the bowl, a shaft secured to the scraper, an undercut bearing for the inner end of the shaft, a bearing for the outer end of the shaft, a sleeve slidably mounted on the shaft and fitting in one of said bearings to hold the shaft therein, said shaft being removable from its bearings and lever-operated means on the shaft, for rotating the scraper.

16. In an ice-cream disher, the combination of a handle, a bowl on the handle, a scraper for the bowl, a shaft secured to the scraper, a lever pivoted to the handle, an undercut bearing for the shaft, a spring-pressed sleeve slidably mounted in said bearing for holding the shaft therein, said shaft and scraper being removably held by the sleeve and lever-operated means for rotating said shaft.

17. In an ice-cream disher, the combination of a handle, a bowl on the handle, a scraper for the bowl, a shaft secured to the scraper, a lever pivoted to the handle, a pinion on said shaft, a lever-operated rack for rotating the pinion, a bearing for the shaft, and a spring-pressed sleeve mounted to slide in said bearing, whereby the shaft will be removably held in the bearing.

18. In an ice-cream disher, the combination of a handle, a bowl on the handle, a scraper for the bowl, a shaft secured to the scraper, a bearing for the inner end of the shaft, a bearing for the outer end of the shaft, a sleeve slidably mounted on the shaft and fitting in one of said bearings to hold the shaft therein, a spring applied to hold said sleeve in one position.

19. In an ice cream spoon, the combination of a spoon body, a removable spindle formed integral with a scraper blade normally positioned within a spoon bowl, a movable collar upon the spindle and adapted to be positioned within a spindle opening adjacent and formed partially within the spoon bowl for locking the spindle and scraper in operative position, and means for actuating the spindle and scraper.

20. In an ice cream spoon, the combination of a spoon body, a removable spindle secured to the spoon body and formed integral with a scraper, said scraper having a lug at its outer end, a spoon bowl having an opening for receiving said lug, the opposite bowl edge having a recess for receiving the spindle, a movable collar adapted to be positioned within said recess for locking the spindle to the bowl, and means for actuating the spindle.

21. In an ice cream spoon, the combination of a spoon body, a removable spindle secured thereto and having a scraper blade having a lug formed integral therewith, a spoon bowl having an opening for receiving said lug, said spoon bowl having a recess of a size to accommodate the spindle, a movable collar adapted to be secured to said spindle within said bowl recess, for locking the spindle to the bowl, and means for actuating the spindle and scraper.

22. In an ice cream spoon, the combination of a spoon body, a removable spindle formed integral with a scraper blade, a locking member movable longitudinally upon the spindle, an undercut bearing formed in the upper bowl portion, said locking member being adapted to be brought into engagement with said bearing, for locking the spindle and scraper in fixed relation to the spoon, and means for actuating the spindle and scraper.

RAYMOND B. GILCHRIST.

Witnesses:
 FRANK W. BEMM,
 AMY JEHLE.